(12) United States Patent
Sung et al.

(10) Patent No.: US 7,947,795 B2
(45) Date of Patent: May 24, 2011

(54) POLYMER FOR FILLING GAPS IN SEMICONDUCTOR SUBSTRATE AND COATING COMPOSITION USING THE SAME

(75) Inventors: Hyun Hoo Sung, Suwon (KR); Jong Seob Kim, Daejeon (KR); Sun Yul Lee, Anyang (KR); Seung Bae Oh, Suwon (KR); Dae Yun Kim, Yeosu (KR)

(73) Assignee: Cheil Industries Inc., Gumi-si (KR)

( * ) Notice: Subject to any disclaimer, the term of this patent is extended or adjusted under 35 U.S.C. 154(b) by 1088 days.

(21) Appl. No.: 11/474,231

(22) Filed: Jun. 23, 2006

(65) Prior Publication Data

US 2007/0100084 A1    May 3, 2007

(30) Foreign Application Priority Data

Nov. 2, 2005 (KR) .................. 10-2005-0104325
Dec. 5, 2005 (KR) .................. 10-2005-0117592

(51) Int. Cl.
*C08F 220/10* (2006.01)
(52) U.S. Cl. ........... 526/318.4; 526/318.41; 526/318.42; 526/318.43; 526/318.44; 526/318.45

(58) Field of Classification Search ............... 526/318.4, 526/318.41, 318.42, 318.43, 318.44, 318.45
See application file for complete search history.

(56) References Cited

U.S. PATENT DOCUMENTS 4,654,395 A * 3/1987 Schulz et al. ............ 526/318.42
5,264,482 A * 11/1993 Taylor et al. .................. 524/548
5,317,063 A * 5/1994 Komatsu et al. ........... 525/330.2

* cited by examiner

*Primary Examiner* — Bernard Lipman
(74) *Attorney, Agent, or Firm* — Summa, Addition & Ashe, P.A.

(57) ABSTRACT

A polymer for filling gaps in a semiconductor substrate and a composition using the polymer are provided. According to the composition, holes having a diameter of 100 nm or less and an aspect ratio (i.e. a ratio between the diameter and height of the holes) of 1 or higher in semiconductor substrates can be substantially completely filled by common spin coating without formation of defects, e.g., air voids, the film can be dissolved by an aqueous alkaline solution (i.e. a developing solution) until a desired thickness is reached, the film is highly resistant to isopropyl alcohol (IPA) and plasma etching after curing by baking, and residue can be rapidly removed from the inside of the holes by ashing.

19 Claims, No Drawings

POLYMER FOR FILLING GAPS IN SEMICONDUCTOR SUBSTRATE AND COATING COMPOSITION USING THE SAME

FIELD OF THE INVENTION

The present invention relates to a polymer for filling gaps in a semiconductor substrate and a composition using the polymer.

BACKGROUND OF THE INVENTION

In general, an ideal coating composition for filling gaps in a semiconductor substrate must satisfy the following seven requirements: (1) the coating composition must completely fill holes having an aspect ratio (i.e. a ratio between the diameter and height of the holes) of 1 or higher and a diameter of 100 nm or less by spin coating, and flatten a substrate to a uniform thickness; (2) no air voids or cracks must be present in portions of the film filled into the holes; (3) the thickness of the film after coating must be maintained constant, regardless of the density of the holes in the substrate; (4) the flattened film must be dissolved at a constant dissolution rate in a developing solution until a desired thickness is reached; (5) the thickness of the film must remain unchanged by washing with isopropyl alcohol (IPA) at 60-70° C. after thermal curing; (6) the film must be highly resistant to plasma etching after thermal curing; and (7) residue must be rapidly removed by ashing without being left inside the holes.

Many attempts have been made to fill gaps in semiconductor substrates. For example, a process is known wherein silicon oxide is deposited by plasma-enhanced chemical vapor deposition (PECVD) and then the resulting oxide layer is removed by chemical mechanical polishing or etch-back until a desired thickness is reached. According to this process, however, defects, e.g., air voids or cracks, are formed within holes or trenches having a diameter of 100 nm or less upon deposition of the oxide. Atomic layer deposition (ALD) equipment must be employed to minimize the formation of defects upon deposition of the oxide. This apparatus is highly priced and makes the deposition of the oxide slow, resulting in low throughput.

SUMMARY OF THE INVENTION

The present invention can provide a polymer for filling gaps in a semiconductor substrate that is highly resistant to isopropyl alcohol (IPA) and plasma etching after curing by baking and can be rapidly removed from the. inside of holes by ashing.

The present invention can also provide a composition using the polymer.

In accordance with one aspect of the present invention, there is provided a polymer for filling gaps in a semiconductor substrate (hereinafter also referred to simply as a "gap-filling polymer"), the polymer comprising structural units of Formulae 1 and 2 below:

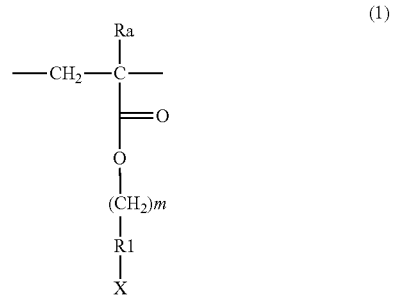

wherein Ra is hydrogen or a methyl group, R1 is $C_{1-12}$ alkyl, substituted or unsubstituted $C_{6-10}$ aromatic, $C_{3-10}$ cycloalkyl or benzyl group, X is hydrogen, a vinyl group or an epoxy group, and m is a number from 0 to 10;

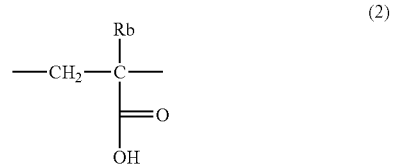

wherein Rb is hydrogen or a methyl group.

In one embodiment, the gap-filling polymer of the present invention comprises about 30 to about 95 mole % of the structural unit of Formula 1 and about 5 to about 70 mole % of the structural unit of Formula 2.

In one embodiment, the gap-filling polymer of the present invention further comprises a structural unit of Formula 3 below:

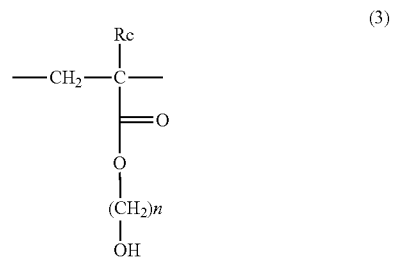

wherein Rc is hydrogen or a methyl group, and n is a number from 1 to 10.

In one embodiment, the gap-filling polymer of the present invention comprises about 1 to about 50 mole % of the structural unit of Formula 3.

In one embodiment, the gap-filling polymer of the present invention has a weight-average molecular weight of about 2,000 to about 30,000, for example, about 4,000 to about 15,000.

In accordance with another aspect of the present invention, there is provided a composition for filling gaps in a semiconductor substrate (hereinafter also referred to simply as a "gap-filling composition"), the composition comprising the gap-filling polymer, a crosslinking agent, an acid catalyst, and an organic solvent.

In one embodiment, the crosslinking agent is melamine, a substituted urea, an epoxy polymer, derivatives thereof, and combinations thereof.

In one embodiment, the crosslinking agent is present in an amount of about 0.1 to about 30 parts by weight, based on 100 parts by weight of the gap-filling polymer.

In one embodiment, the acid catalyst is at least one acid selected from mineral acids, sulfonic acid, oxalic acid, maleic acid, hexamic cyclohexylsulfonic acid, and phthalic acid, and combinations thereof.

In one embodiment, the acid catalyst is present in an amount of about 0.01 to about 10 parts by weight, based on 100 parts by weight of the gap-filling polymer.

In one embodiment, the organic solvent is at least one solvent selected from the group consisting of alcohols, esters, glymes, ethers, cyclic ketones, and combinations thereof.

In one embodiment, the organic solvent contains about 5% or more by weight of an alcohol, based on the total weight of the organic solvent.

In one embodiment, the organic solvent is present in an amount of about 100 to about 3,000 parts by weight, based on 100 parts by weight of the gap-filling polymer.

In one embodiment, the gap-filling composition of the present invention further comprises an amine compound.

In one embodiment, the amine compound is a secondary amine, a tertiary amine, or a mixture thereof.

In one embodiment, the amine compound is added in an amount of about 0.01 to about 10 parts by weight, based on 100 parts by weight of the gap-filling polymer.

In one embodiment, the gap-filling composition of the present invention further comprises a surfactant.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

A gap-filling polymer of the present invention is characterized in that it can be dissolved at a dissolution rate (DR) of about 0.5 to about 500 nm/s, for example, about 5 to about 50 nm/s, in a developing solution by controlling the molar ratio between hydroxyl and carboxyl groups in repeating units, and residue can be completely removed by ashing without being left inside holes.

The gap-filling polymer comprises structural units of Formulae 1 and 2 below:

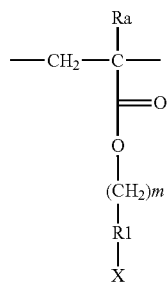

wherein Ra is hydrogen or a methyl group, R1 is $C_{1-12}$ alkyl, substituted or unsubstituted $C_{6-10}$ aromatic, $C_{3-10}$ cycloalkyl or benzyl, X is hydrogen, a vinyl group or an epoxy group, and m is a number from 0 to 10;

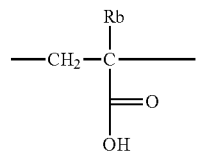

wherein Rb is hydrogen or a methyl group. Exemplary substituents of the substituted aromatic group can include without limitation hydroxy, amine, sulfone, and any other substituent group which can form a crosslinking bond.

The gap-filling polymer of the present invention can comprise about 30 to about 95 mole % of the structural unit of Formula 1 and about 5 to about 70 mole % of the structural unit of Formula 2.

The gap-filling polymer of the present invention can further comprise a structural unit of Formula 3 below:

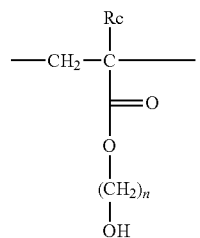

wherein Rc is hydrogen or a methyl group, and n is a number from 1 to 10.

The gap-filling polymer of the present invention can comprise about 1 to about 50 mole % of the structural unit of Formula 3.

The gap-filling polymer of the present invention can have a weight-average molecular weight of about 2,000 to about 30,000, for example, about 4,000 to about 15,000, on a polystyrene basis. If the gap-filling polymer has too low a molecular weight, sufficient curability may not be attained. Meanwhile, if the gap-filling polymer has too high a molecular weight, the solvent solubility and application uniformity can be deteriorated. The dispersity of the molecular weight can be in the range of about 1 to about 5, for example in the range of about 1.2 to about 3.

On the other hand, the polymer can be synthesized without particular limitation by processes well known in the art. The polymer can be synthesized using a radical polymerization initiator in the same organic solvent as that constituting a composition of the present invention. The type of the organic solvent used for the polymerization is not especially restricted, and the organic solvent can be the same as a constituent organic solvent of a composition of the present invention. The amount of the organic solvent used in the polymerization can be controlled so that the polymer is present in an amount of about 5 to about 50% by weight, for example, about 15 to about 40% by weight, relative to the weight of the solution of the polymer in the organic solvent. When the concentration of the polymer in the solution is less than about 5% by weight, the polymerization rate can be low and thus some of the monomers can remain unreacted. Meanwhile, when the concentration of the polymer in the solution exceeds about 50% by weight, the solution can be highly viscous, which can make it difficult to handle and to control the reaction rate.

Suitable polymerization initiators that can be used for the synthesis of the polymer include any known initiators, for example, thermal polymerization initiators, photopolymerization initiators and redox initiators. Peroxide type and azo type radical polymerization initiators can provide ease of handling and easy control of the reaction rate and molecular weight.

Examples of peroxide type polymerization initiators that can be used in the present invention include methyl ethyl ketone peroxide, cyclohexanone peroxide, methyl cyclohexanone peroxide, acetyl acetone peroxide, 1,1-bis(tert-butylperoxy)-3,3,5-trimethylcyclohexane, 1,1-bis(tert-butylperoxy)cyclohexane, 1,1-bis(tert-hexylperoxy)-3,3,5-trimethylcyclohexane, 1,1-bis(tert-hexylperoxy)cyclohexane, 1,1-bis(tert-butylperoxy)cyclododecane, isobutyl peroxide, lauroyl peroxide, succinic acid peroxide, 3,5,5-trimethylhexanoyl peroxide, benzoyl peroxide, octanoyl peroxide, stearoyl peroxide, diisopropyl peroxydicarbonate, di-n-propyl peroxydicarbonate, di-2-ethylhexyl peroxydicarbonate, di-2-ethoxyethyl peroxydicarbonate, di-2-methoxybutyl peroxydicarbonate, bis-(4-tert-butylcyclohexyl)peroxydicarbonate, (α,α-bis-neodecanoylperoxy) diisopropylbenzene, peroxy cumyl neodecanoic acid ester, peroxy octyl neodecanoic acid ester, peroxy hexyl neodecanoic acid ester, peroxy tert-butyl neodecanoic acid ester, peroxy tert-hexyl pivalic acid ester, peroxy tert-butyl pivalic acid ester, 2,5-dimethyl-2,5-bis(2-ethylhexanoylperoxy)hexane, 1,1,3,3-tetramethylbutylperoxy-2-ethylhexanoate, peroxy-2-ethyl-tert-hexyl hexanoic acid ester, peroxy-2-ethyl-tert-butyl hexanoic acid ester, peroxy-2-ethyl-tert-butyl hexanoic acid ester, peroxy-3-methyl-tert-butyl propionic acid ester, peroxy-tert-butyl lauric acid ester, tert-butylperoxy-3,5,5-trimethylhexanoate, tert-hexyl peroxyisopropyl monocarbonate, tert-butylperoxy isopropyl carbonate, 2,5-dimethyl-2,5-bis(benzoylperoxy)hexane, tert-butyl peracetic acid ester, tert-hexyl perbenzoic acid ester, and tert-butyl perbenzoic acid ester, and combinations thereof. Combinations of the peroxide type polymerization initiators with reductants can be used as redox initiators.

Examples of azo type polymerization initiators that can be used in the present invention include 1,1-azobis(cyclohexane-1-carbonitrile), 2,2'-azobis(2-methyl-butyronitrile), 2,2'-azobisbutyronitrile, 2,2'-azobis(2,4-dimethyl-valeronitrile), 2,2'-azobis(2,4-dimethyl-4-methoxyvaleronitrile), 2,2'-azobis(2-amidino-propane) hydrochloride, 2,2'-azobis[2-(5-methyl-2-imidazolin-2-yl)propane]hydrochloride, 2,2'-azobis[2-(2-imidazolin-2-yl)propane]hydrochloride, 2,2'-azobis[2-(5-methyl-2-imidazolin-2-yl)propane], 2,2'-azobis[2-methyl-N-(1,1-bis(2-hydroxymethyl)-2-hydroxyethyl] propionic amide, 2,2'-azobis[2-methyl-N-(2-hydroxyethyl) propionic amide], 2,2'-azobis(2-methyl-propionic amide) dihydrate, 4,4'-azobis(4-cyano-valeic acid), 2,2'-azobis(2-hydroxymethylpropionitrile), 2,2'-azobis(2-methylpropionic acid)dimethyl ester (dimethyl-2,2'-azobis(2-methylpropionate)), and cyano-2-propylazoformamide, and combinations thereof.

These peroxide type and azo type polymerization initiators can be used as mixtures of two or more kinds. In addition to the peroxide type and azo type polymerization initiators, a molecular weight-controlling agent, such as a chain-transfer agent, a chain-terminating agent, or a polymerization promoter, can be further added during preparation of the polymer in order to achieve the molecular weight range. As suitable molecular weight-controlling agents, there can be mentioned, for example, mercaptopropionic acid, mercaptopropionic acid ester, thioglycol, thioglycerin, dodecylmercaptan, and a-methylstyrene dimers, and combinations thereof.

The reaction temperature for the preparation of the gap-filling polymer according to the present invention can be in the range of about 50 to about 120° C.

The present invention also provides a composition for filling gaps in a semiconductor substrate, the composition comprising the gap-filling polymer, a crosslinking agent, an acid catalyst, and an organic solvent.

The crosslinking agent used in the gap-filling composition of the present invention causes a crosslinking reaction upon being heated or fired. Examples of such crosslinking agents include melamines, substituted ureas, epoxy polymers, and derivatives thereof, and combinations thereof. Exemplary compounds can contain at least two crosslinking groups, e.g., divinylbenzene, divinylsulfone, triacrylformal, acrylic acid esters, methacrylic acid esters of glyoxyl and polyhydric alcohols, and compounds in which two or more amino groups of melamine, urea, benzoguanamine and glycoluryl are substituted with a methylol group or a lower alkoxy methyl group. Other exemplary compounds include tetramethoxymethylglycoluryl and hexamethoxymethylmelamine.

The amount of the crosslinking agent added varies depending on the viscosity of the solution, the desired film shape, and the like. The amount of the crosslinking agent can be about 0.1 to about 30 parts by weight, from example about 1 to about 20 parts by weight, and as another example about 5 to about 15 parts by weight, based on 100 parts by weight of the gap-filling polymer.

As the acid catalyst used in the gap-filling polymer of the present invention, there can be used at least one acid selected from mineral acids, sulfonic acid, oxalic acid, maleic acid, hexamic cyclohexylsulfonic acid, and phthalic acid, and combinations thereof. These acids promote the thermal curing. Exemplary acids include para-toluenesulfonic acid, trifluoromethanesulfonic acid, pyridinium para-toluenesulfonate, and compounds having the structures represented by the following Formula 4:

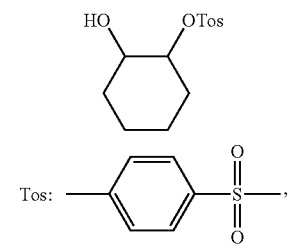

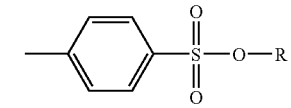

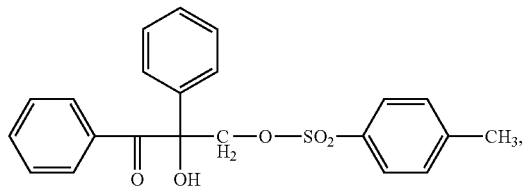

-continued

[Chemical structure diagrams showing various acid catalyst compounds]

These acid catalysts may be used alone or in combination thereof.

The acid catalyst is a catalyst for activating the crosslinking reaction between the polymer and the crosslinking agent. When the composition comprising the acid catalyst is applied to a wafer, followed by thermal processing, e.g., baking, the acid catalyst generates an acid. The crosslinking reaction occurs in the presence of the acid, which renders the composition highly resistant to washing with isopropyl alcohol (IPA) and plasma etching.

The amount of the acid catalyst used can be about 0.01 to about 10 parts by weight, for example about 0.05 to about 5 parts by weight, based on 100 parts by weight of the gap-filling polymer. Too small an amount of the acid catalyst can result in the possibility that the polymer may be dissolved in isopropyl alcohol after being crosslinked. Meanwhile, too large an amount of the acid catalyst may deteriorate the storage stability of the composition.

Examples of the organic solvent used in the gap-filling composition of the present invention include any common organic solvent, particularly, alcohols, esters, glymes, ethers and cyclic ketones having a boiling point of about 70 to about 180° C., as well as combinations thereof.

The organic solvent can be selected from the group consisting of diethylene glycol monomethyl ether, diethylene glycol diethyl ether, ethyl-3-ethoxy propionate, methyl-3-methoxy propionate, cyclopentanone, cyclohexanone, propylene glycol monomethyl ether acetate, propylene glycol dimethyl ether acetate, 1-methoxy-2-propanol, ethyl lactate, and hydroxyethyl acetate.

These organic solvents may be used alone or in combination thereof. The organic solvent can be used in an amount of about 100 to about 3,000 parts by weight, based on 100 parts by weight of the gap-filling polymer. For example, about 5% or more by weight of an alcohol, e.g., 1-methoxy-2-propanol or ethyl lactate, can be used with respect to the total weight of the organic solvent in order to achieve improved coatability and storage stability. These organic solvents may be used alone or in combination thereof.

The gap-filling composition of the present invention can further comprise an amine compound. The amine is added for the purpose of preventing slow curing due to the presence of the acid catalyst at room temperature and improving the storage stability of the composition. Examples of suitable amine compounds include secondary amines, e.g., diethylamine, dipropylamine, dibutylamine and dipentylamine, and tertiary amines, e.g., trimethylamine, triethylamine, tripropylamine, tributylamine, tripentylamine, N,N-dimethylpropylamine, N-ethyl-N-methylbutylamine, N,N-diethylmonoethanolamine, triethanolamine, N,N-diethylaniline, N-ethyl-N-methylaniline, N,N-dimethyltoluidine, N-ethyldiphenylamine, N-ethyldiphenylamine and triphenylamine. These amine compounds may be used alone or in combination thereof. The amine compound can be present in an amount of about 0.01 to about 10 parts by weight, for example about 0.05 to about 5 parts by weight, based on 100 parts by weight of the gap-filling polymer.

On the other hand, the gap-filling composition of the present invention may further comprise a surfactant for improving the dispersibility, film thickness uniformity and gap-filling properties in semiconductor substrates. Examples of such surfactants include: polyoxyethylene alkyl ethers, e.g., polyoxyethylene lauryl ether, polyoxyethylene stearyl ether, polyoxyethylene cetyl ether and polyoxyethylene oleyl ether; polyoxyethylene alkyl aryl ethers, e.g., polyoxyethylene nonyl phenol ether; polyoxyethylene-polyoxypropylene block copolymers; non-ionic surfactants, e.g., polyoxyethylene sorbitan fatty acid esters, for example, sorbitan monolaurate, sorbitan monoplamitate, sorbitan monostearate, sorbitan monooleate, polyoxyethylene sorbitan monostearate, polyoxyethylene sorbitan trioleate and polyoxyethylene sorbitan tristearate; fluorinated surfactants, e.g., Eftop EF301, EF303 and EF352 (Tohkem Products KK), Megafac F171 and F173 (Dainippon Ink & Chemicals KK), Fluorad FC430 and FC431 (Sumitomo-3M Co., Ltd.), Asahiguard AG710, Surflon S-382, SC101, SC102, SC103, SC104, SC105 and SC106 (Asahi Glass Co., Ltd.); and organosiloxane polymers, e.g., KP341 (Shin-Etsu Chemical Co., Ltd.). These surfactants can be added in an amount of about 0.001 to about 5 parts by weight with respect to 100 parts by weight of the total solids of the composition according to the present invention. These surfactants may be added alone or in combination thereof.

The present invention will now be described in more detail with reference to the following examples and comparative examples. However, these examples are given for the purpose of illustration and are not to be construed as limiting the scope of the invention.

EXAMPLE 1

1. Synthesis of Polymer (A) (MAA 10.5%)

501.4 g of propylene glycol monomethyl ether acetate is placed in a 1,000 ml flask equipped with a reflux condenser and an agitator. The reaction temperature is raised to 80° C. with stirring. A mixture of 152 g of benzyl methacrylate, 43.7 g of 2-hydroxy ethyl methacrylate, 22.96 g of methacrylic acid, and 40.5 g of dimethyl-2,2'-azobis(2-methylpropionate) is added dropwise to the flask with stirring while the reaction temperature is maintained at 80° C. After completion of the addition, the reaction mixture is allowed to react with stirring for 10 hours or less while maintaining the reaction temperature at 120° C. or lower, giving a transparent solution of a polymer (A). Gel permission chromatography (GPC) of the solution indicates that the polymer has a weight-average molecular weight of 7,100 and a number-average molecular weight of 2,900 on a polystyrene basis.

2. Preparation of Composition for Filling Gaps in Semiconductor Substrate 2.88 g of a melamine resin (Cymel 303LF, Cytec, U.S.A.), 0.04 g of pyridinium para-toluenesulfonate, 0.28 g of a surfactant (frorard FC-430, Sumitomo-3M Co., Ltd.) and 10.05 g of propylene glycol monomethyl ether acetate are added to 83 g of the polymeric solution (A), dissolved with sufficient stirring, and filtered to prepare the desired gap-filling composition (E).

EXAMPLE 2

1. Synthesis of Polymer (B) (MAA 11%)

A polymer (B) is prepared in the same manner as in Example 1 (polymer (A)), except that 150.9 g of benzyl methacrylate, 43.7 g of 2-hydroxy ethyl methacrylate, 24.1 g of methacrylic acid and 40.5 g of dimethyl 2,2'-azobis(2-methylpropionate) are used. Gel permission chromatography (GPC) of the solution indicates that the polymer has a weight-average molecular weight of 7,000 and a number-average molecular weight of 2,900 on a polystyrene basis.

2. Synthesis of Polymer (C) (MAA 11.5%)

A polymer (C) is prepared in the same manner as in Example 1 (polymer (A)), except that 149.8 g of benzyl methacrylate, 43.7 g of 2-hydroxy ethyl methacrylate, 25.1 g of methacrylic acid and 40.5 g of dimethyl-2,2'-azobis(2-methylpropionate) are used. Gel permission chromatography (GPC) of the solution indicates that the polymer has a weight-average molecular weight of 7,000 and a number-average molecular weight of 2,900 on a polystyrene basis.

3. Preparation of Gap-Filling Composition 42 g of the polymer (A), 42 g of the polymer (B), 2.88 g of a melamine resin (Cymel 303LF, Cytec, U.S.A.), 0.04 g of pyridinium para-toluenesulfonate (Aldrich, U.S.A.), 0.28 g of a surfactant (frorard FC-430, Sumitomo-3M Co., Ltd.) and 10.05 g of propylene glycol monomethyl ether acetate are mixed, dissolved with sufficient stirring, and filtered to prepare the desired gap-filling composition (F).

EXAMPLE 3

1. Preparation of Gap-filling Composition 83 g of the polymer (B), 2.88 g of a melamine resin (Cymel 303LF, Cytec, U.S.A.), 0.04 g of pyridinium para-toluenesulfonate (Aldrich, U.S.A.), 0.28 g of a surfactant (frorard FC-430, Sumitomo-3M Co., Ltd.), and 10.05 g of propylene glycol monomethyl ether acetate are mixed, dissolved with sufficient stirring, and filtered to prepare the desired gap-filling composition (G).

EXAMPLE 4

1. Preparation of Gap-filling Composition 42 g of the polymer (B), 42 g of the polymeric solution (C), 2.88 g of a melamine resin (Cymel 303LF, Cytec, U.S.A.), 0.04 g of pyridinium para-toluenesulfonate (Aldrich, U.S.A.), 0.28 g of a surfactant (frorard FC-430, Sumitomo-3M Co., Ltd.) and 10.05 g of propylene glycol monomethyl ether acetate are mixed, dissolved with sufficient stirring, and filtered to prepare the desired gap-filling composition (H).

EXAMPLE 5

1. Preparation of Gap-filling Composition 83 g of the polymer (C), 2.88 g of a melamine resin (Cymel 303LF, Cytec, U.S.A.), 0.04 g of pyridinium para-toluenesulfonate (Aldrich, U.S.A.), 0.28 g of a surfactant (frorard FC-430, Sumitomo-3M Co., Ltd.) and 10.05 g of propylene glycol monomethyl ether acetate are mixed, dissolved with sufficient stirring, and filtered to prepare the desired gap-filling composition (I).

EXAMPLE 6

1. Synthesis of Polymer (D)

501.4 g of propylene glycol monomethyl ether acetate is placed in a 1,000 ml flask equipped with a reflux condenser and an agitator. The reaction temperature is raised to 80° C. with stirring. A mixture of 150.9 g of benzyl methacrylate, 43.7 g of 2-hydroxy ethyl methacrylate, 24.1 g of methacrylic acid, and 40.5 g of dimethyl-2,2'-azobis(2-methylpropionate) is added dropwise to the flask with stirring while the reaction temperature is maintained at 80° C. After completion of the addition, the reaction mixture is allowed to react with stirring for 10 hours or less while maintaining the reaction temperature at 120° C. or lower, giving a transparent solution of a polymer (D). Gel permission chromatography (GPC) of the solution indicates that the polymer has a weight-average molecular weight of 7,100 and a number-average molecular weight of 2,900 on a polystyrene basis.

2. Preparation of Gap-Filling Composition 2.88 g of a melamine resin (Cymel 303LF, Cytec, U.S.A.), 0.04 g of pyridinium para-toluenesulfonate, 0.05 g of triethylamine, 0.28 g of a surfactant (frorard FC-430, Sumitomo-3M Co., Ltd.) and 10.05 g of propylene glycol monomethyl ether acetate are added to 83 g of the polymeric solution (D), dissolved with sufficient stirring, and filtered to prepare the desired gap-filling composition (J).

EXAMPLE 7

1. Preparation of Gap-filling Composition 2.88 g of a melamine resin (Cymel 303LF, Cytec, U.S.A.), 0.04 g of pyridinium para-toluenesulfonate (Aldrich, U.S.A.), 0.05 g of triethylamine, 0.28 g of a surfactant (frorard FC-430, Sumitomo-3M Co., Ltd.), 10 g of 1-methoxy-2-propanol and 10.05 g of propylene glycol monomethyl ether acetate are added to 86 g of the polymer (D) prepared in Example 6, dissolved with sufficient stirring, and filtered to prepare the desired gap-filling composition (K).

Comparative Example 1

1. Preparation of Gap-filling Composition 25 g of a phenolic novolac resin (PSM-4326, Gunei Chemical Inc., Japan), 2.88 g of a melamine resin (Cymel 303LF, Cytec, U.S.A.), 0.04 g of pyridinium para-toluenesulfonate (Aldrich, U.S.A.), 0.28 g of a surfactant (frorard FC-430, Sumitomo-3M Co., Ltd.) and 68.05 g of propylene glycol monomethyl ether acetate are mixed, dissolved with sufficient stirring, and filtered to prepare the desired gap-filling composition (L).

Comparative Example 2

1. Preparation of Gap-filling Composition 2.88 g of a melamine resin (Cymel 303LF, Cytec, U.S.A.), 0.04 g of pyridinium para-toluenesulfonate, 0.28 g of a surfactant (frorard FC-430, Sumitomo-3M Co., Ltd.) and 10.05 g of propylene glycol monomethyl ether acetate are added to 83 g of the polymeric solution (D), dissolved with sufficient stirring, and filtered to prepare the desired gap-filling composition (M).

The gap-filling compositions prepared in Examples 1 to 7 and Comparative Examples 1 and 2 are tested for the gap-filling properties, dissolution rate (DR) in a developing solution, IPA resistance, plasma etching resistance and removal performance by ashing in accordance with the following respective procedures. The results are shown in Table 1.

(1) Gap-Filling Properties

Each of the compositions prepared in Examples 1 to 7 and Comparative Examples 1 and 2 is spin-coated on a silicon-patterned wafer having holes (diameter: 80 nm, height: 1,700 nm) under the same conditions, and soft-baked at 90° C. for one minute to evaporate the solvents. The cross section of the wafer is observed under a scanning electron microscope to determine whether or not the composition is substantially completely filled into the holes without formation of voids.

(2) Dissolution Rate (DR)

Each of the compositions prepared in Examples 1 to 7 and Comparative Examples 1 and 2 is spin-coated on an 8"-inch silicon wafer under the same conditions, and soft-baked at 90° C. for one minute until the thickness of the film reaches about 500 nm. The average dissolution rate of the coated wafer is measured using a resist development system (RDA-760 system, Litho Tech Japan, Japan). The developing solution herein used has a concentration of 2.38% and a temperature of 23.0° C.

(3) IPA Resistance

Each of the compositions prepared in Examples 1 to 7 and Comparative Examples 1 and 2 is spin-coated on an 8"-inch silicon wafer under the same conditions, hard-baked at 220° C. for one minute, and dipped in isopropyl alcohol at 70° C. for 5 minutes to measure changes in thickness. When the difference in thickness before and after dipping in isopropyl alcohol is 1% or less, the IPA resistance is judged to be "Good". When the difference in thickness before and after dipping in isopropyl alcohol is larger than 1%, the IPA resistance is judged to be "Poor".

(4) Storage Stability (Change in Film Thickness)

After each of the compositions prepared in Examples 1 to 7 and Comparative Examples 1 and 2 is stored at room temperature (23° C.) for 60 days, it is spin-coated on an 8"-inch silicon wafer under the same conditions and soft-baked at 90° C. for one minute to form a coating film on the silicon wafer. The thickness of the film is measured. The difference in the thickness of the film is calculated in comparison with the thickness measured immediately after preparation of the composition. When the difference in the film thickness is within 5%, the storage stability is judged to be "Good". When the difference in the film thickness is outside 5%, the storage stability is judged to be "Poor".

(5) Storage Stability (Change in DR)

After each of the compositions prepared in Examples 1 to 7 and Comparative Examples 1 and 2 is stored at room temperature (23° C.) for 60 days, it is spin-coated on an 8"-inch silicon wafer under the same conditions and soft-baked at 90° C. for one minute to form a coating film on the silicon wafer. The average DR value of the coated wafer is obtained by a DR measurement method. The difference in the DR value is calculated in comparison with the DR value measured immediately after preparation of the composition. When the difference in the DR value is within 10%, the storage stability is judged to be "Good". When the difference in the DR value is outside 10%, the storage stability is judged to be "Poor".

(6) Oxygen Plasma Etching Resistance

Each of the compositions prepared in Examples 1 to 7 and Comparative Examples 1 and 2 is spin-coated on an 8"-inch silicon wafer under the same conditions, and hard-baked at 220° C. for one minute. The coating film is observed to see whether the film is peeled by oxygen plasma etching or not.

(7) Observation of Residue After Oxygen Ashing

Each of the compositions prepared in Examples 1 to 7 and Comparative Examples 1 and 2 is spin-coated on a patterned wafer having holes (aspect ratio: 20, width: 80 nm), and soft-baked at 90° C. The developing solution is applied to the coating film to remove all portions of the coating film formed on regions other than the holes. The developed wafer is cured at 220° C., and observed to see whether residue is removed from the inside the holes by oxygen ashing.

TABLE 1

| | Gap-filling properties | DR (nm/s) | IPA resistance | Plasma etching resistance | Residue after ashing |
|---|---|---|---|---|---|
| Example 1 | Good | 20.1 | Good | Good | Not observed |
| Example 2 | Good | 23.6 | Good | Good | Not observed |
| Example 3 | Good | 27.4 | Good | Good | Not observed |
| Example 4 | Good | 31.9 | Good | Good | Not observed |
| Example 5 | Good | 36.9 | Good | Good | Not observed |
| Comparative Example 1 | Good | 28.8 | Poor | Good | Observed |

TABLE 2

| | Gap-filling properties | DR (nm/s) | Storage stability | | IPA resistance | Plasma etching resistance | Residue after ashing |
|---|---|---|---|---|---|---|---|
| | | | Change in thickness | Change in DR | | | |
| Example 6 | Good | 27.3 | Good | Good | Good | Good | Not observed |
| Example 7 | Good | 27.4 | Good | Good | Good | Good | Not observed |
| Comparative Example 2 | Good | 27.1 | Good | Poor | Good | Good | Not observed |

As apparent from the above description, according to the coating composition of the present invention, holes having a diameter of 100 nm or less and an aspect ratio (i.e. a ratio between the diameter and height of the holes) of 1 or higher in semiconductor substrates can be substantially completely filled by spin coating without formation of defects, e.g., air voids, the film can be dissolved by an aqueous alkaline solution (i.e. a developing solution) until a desired thickness is reached, the film is highly resistant to isopropyl alcohol (IPA) and plasma etching after curing by baking, the film has superior storage stability, and residue can be rapidly removed from the inside of the holes by ashing. Therefore, the coating composition of the present invention can be suitably used to fabricate semiconductor devices.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. A polymer for filling gaps in a semiconductor substrate, comprising structural units of Formulae 1, 2, and 3 below:

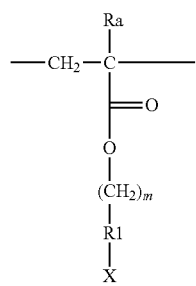
(1)

wherein Ra is hydrogen or a methyl group, R1 is substituted or unsubstituted $C_{6-10}$ aromatic, $C_{3-10}$ cycloalkyl or benzyl group, X is hydrogen, a vinyl group or an epoxy group, and m is a number from 0 to 10;

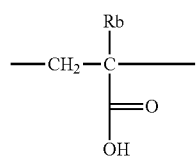
(2)

wherein Rb is hydrogen or a methyl group; and

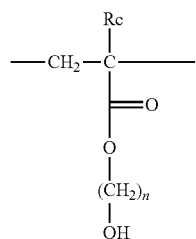
(3)

wherein Rc is hydrogen or a methyl group, and n is a number from 1 to 10,
wherein the polymer comprises about 5 mole % to about 70 mole % of the structural unit of Formula 2 and about 1 mole % to about 50 mole % of the structural unit of Formula 3.

2. The polymer according to claim 1, wherein the polymer has a weight-average molecular weight of about 2,000 to about 30,000.

3. The polymer according to claim 1, wherein the polymer has a weight-average molecular weight of about 4,000 to about 15,000.

4. A composition for filling gaps in a semiconductor substrate, the composition comprising the polymer according to claim 1, a crosslinking agent, an acid catalyst, and an organic solvent.

5. The composition according to claim 4, wherein the crosslinking agent is melamine, a substituted urea, an epoxy polymer, or a derivative thereof.

6. The composition according to claim 4, wherein the crosslinking agent is present in an amount of about 0.1 to about 30 parts by weight, based on 100 parts by weight of the polymer.

7. The composition according to claim 4, wherein the acid catalyst is at least one acid selected from mineral acids, sulfonic acid, oxalic acid, maleic acid, hexamic cyclohexylsulfonic acid, phthalic acid, and combinations thereof.

8. The composition according to claim 4, wherein the acid catalyst is present in an amount of about 0.01 to about 10 parts by weight, based on 100 parts by weight of the polymer.

9. The composition according to claim 4, wherein the organic solvent is at least one solvent selected from the group consisting of alcohols, esters, glymes, ethers, cyclic ketones, and combinations thereof.

10. The composition according to claim 4, wherein the organic solvent contains about 5% or more by weight of an alcohol.

11. The composition according to claim 4, wherein the organic solvent is present in an amount of about 100 to about 3,000 parts by weight, based on 100 parts by weight of the polymer.

12. The composition according to claim 4, further comprising an amine compound.

13. The composition according to claim 12, wherein the amine compound is a secondary amine, a tertiary amine, or a mixture thereof.

14. The composition according to claim 12, wherein the amine compound is added in an amount of about 0.01 to about 10 parts by weight, based on 100 parts by weight of the polymer.

15. The composition according to claim 4, further comprising a surfactant.

16. A polymer for filling gaps in a semiconductor substrate, comprising structural units of Formulae 1, 2, and 3 below:

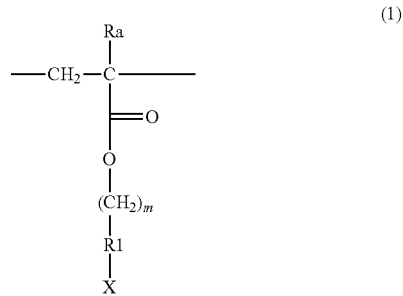
(1)

wherein Ra is hydrogen or a methyl group, R1 is $C_{1-12}$ alkyl, substituted or unsubstituted $C_{6-10}$ aromatic, $C_{3-10}$ cycloalkyl or benzyl group, X is a vinyl group and m is a number from 1 to 10;

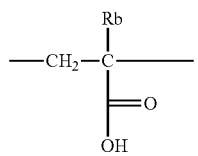

(2)

wherein Rb is hydrogen or a methyl group; and

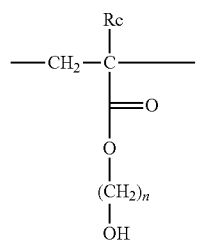

(3)

wherein Rc is hydrogen or a methyl group, and n is a number from 1 to 10, and wherein the polymer comprises about 5 mole % to about 70 mole % of the structural unit of Formula 2 and about 1 mole % to about 50 mole % of the structural unit of Formula 3.

17. The polymer according to claim 1, wherein the structural unit of Formula 3 comprises 2-hydroxyl ethyl methacrylate.

18. A polymer for filling gaps in a semiconductor substrate, comprising structural units of benzyl methacrylate, methacrylic acid, and Formula 3 below:

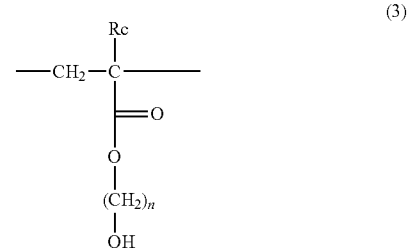

(3)

wherein Rc is hydrogen or a methyl group, and n is a number from 1 to 10, and wherein the polymer comprises about 5 mole % to about 70 mole % of methacrylic acid and about 1 mole % to about 50 mole % of the structural unit of Formula 3.

19. A polymer for filling gaps in a semiconductor substrate, comprising structural units of benzyl methacrylate, methacrylic acid, and 2-hydroxyl ethyl methacrylate, wherein the polymer comprises about 5 mole % to about 70 mole % of methacrylic acid and about 1 mole % to about 50 mole % of 2-hydroxyl ethyl methacrylate.

* * * * *